United States Patent
Wilson (10) Patent No.: US 6,808,838 B1
(45) Date of Patent: Oct. 26, 2004

(54) DIRECT METHANOL FUEL CELL AND SYSTEM

(75) Inventor: Mahlon S. Wilson, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 32 days.

(21) Appl. No.: 10/140,612

(22) Filed: May 7, 2002

(51) Int. Cl.⁷ .................. H01M 8/10; H01M 2/00; H01M 2/02; H01M 8/04; H01M 8/12
(52) U.S. Cl. .................. 429/34; 429/30; 429/22
(58) Field of Search .................. 429/30, 34, 38, 429/39, 22

(56) References Cited

U.S. PATENT DOCUMENTS

| | | | |
|---|---|---|---|
| 4,132,695 A | * 1/1979 | Burkholder | 260/29.6 |
| 4,537,840 A | * 8/1985 | Tsukui et al. | 429/33 |
| 4,828,941 A | * 5/1989 | Sterzel | 429/33 |
| 4,931,168 A | * 6/1990 | Watanabe et al. | 204/284 |
| 5,523,177 A | * 6/1996 | Kosek et al. | 429/40 |

OTHER PUBLICATIONS

Narayanan et al., "Reduced Size Fuel Cell for Portable Applications," US patent application Publication, US 2001/0051293 A1, Dec. 13, 2001.

* cited by examiner

*Primary Examiner*—Patrick Ryan
*Assistant Examiner*—Julian Mercado
(74) *Attorney, Agent, or Firm*—Ray G. Wilson (57) ABSTRACT

A fuel cell having an anode and a cathode and a polymer electrolyte membrane located between anode and cathode gas diffusion backings uses a methanol vapor fuel supply. A permeable polymer electrolyte membrane having a permeability effective to sustain a carbon dioxide flux equivalent to at least 10 $mA/cm^2$ provides for removal of carbon dioxide produced at the anode by reaction of methanol with water. Another aspect of the present invention includes a superabsorpent polymer material placed in proximity to the anode gas diffusion backing to hold liquid methanol or liquid methanol solution without wetting the anode gas diffusion backing so that methanol vapor from the liquid methanol or liquid methanol-water solution is supplied to the membrane.

12 Claims, 9 Drawing Sheets

DIRECT METHANOL FUEL CELL AND SYSTEM

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to direct methanol fuel cells, and, more particularly, to air breathing fuel cells using methanol vapor fuel.

BACKGROUND OF THE INVENTION

The use of methanol as a direct fuel supply for fuel cells is now the subject of numerous fuel cell development programs because the supply and storage of the liquid methanol is much simpler than a hydrogen fuel supply. A typical methanol feed fuel cell includes a membrane-electrode assembly (MEA), typically an anode, cathode, and a polymer electrolyte membrane, sandwiched between porous backings for supplying fuel and oxidant reactants to the MEA. The following electrochemical reaction occurs at the fuel cell anode:

$$CH_3OH + H_2O \rightarrow CO_2 + 6H^+ + 6e^-$$

Simultaneous with the anode reaction, the electro-reduction of oxygen occurs at the cathode:

$$O_2 + 4H^+ + 4e^- \rightarrow H_2O$$

The overall reaction is then given by:

$$CH_3OH + 1.5O_2 \rightarrow CO_2 + 2H_2O$$

Most early direct methanol fuel cell (DMFC) research was performed using a vapor-phase methanol fuel feed. A typical vapor feed set-up used a carrier gas sparged through a conventional humidifier bottle containing a methanol-water mixture. The methanol vapor concentration was controlled by humidifier bottle temperature and/or by the composition of the methanol mixture in the bottle. In a practical system, fuel management of a methanol vapor fuel supply is not trivial because of position-tolerance and evaporation heat issues.

Subsequently, the simpler approach of supplying liquid methanol became the preferred method of introducing the methanol fuel, and is subsequently used in the majority of current direct methanol efforts. The use of the liquid feed requires that the methanol must be supplied as a fairly dilute methanol-water mixture. Dilute solutions are necessary to minimize the amount of methanol lost through the membrane to the cathode (air) side.

Substantial effort has been expended to develop membranes that are highly ionic conductive and still minimize methanol cross-over, but no entirely satisfactory membranes yet exist. Instead, in order to minimize the cross-over, relatively thick membranes are used. For example, a commonly used membrane for direct methanol cells is Nafion 117 (7-mils or about 175 $\mu$m thick). This is in contrast to hydrogen fuel cells, in which membranes as thin as 1-mil (25 $\mu$m) are now commonly used.

The thicker membrane increases cell resistance, but the methanol cross-over is decreased to a degree that the net performance and efficiency of the cell favors the thicker membrane. Despite the use of the thicker membrane, feed concentrations are typically less than about 1 Molar methanol to provide the best overall results. Amongst the limitations of using the dilute feed, however, are 1) a fuel management system is required to mix and recirculate the dilute feed, and 2) a large majority of the water from the cell needs to be recovered to make up the dilute feed. Another issue, whether liquid or vapor feed, is the removal of the by-product carbon dioxide per the above anode reaction equation. Unless recovered from the effluent $CO_2$ stream, methanol vapor is released from the system. In consumer applications, venting methanol may be undesirable. Consequently, a subsystem to recover or separately oxidize the methanol is probably required in many instances.

A particular area of interest for direct methanol fuel cells is for use as small battery replacements for portable electronics and the like. Because of the relative simplicity of a dilute liquid methanol feed approach and the early indications of high performance capabilities, most battery-replacement research is ongoing with dilute liquid methanol fuel feed. In one direct methanol fuel cell configuration, unpressurized air (ambient pressure air) is the source of oxidant for the methanol fuel. Air-breathers using stored dilute methanol as the liquid feed have been pursued as portable power supplies (see, e.g., U.S. patent application Ser. No. 09/726,836, filed Nov. 30, 2000), although batteries have a higher energy content than available from the dilute liquid methanol fuel (about 2% methanol in rim water) now being considered. In this case, the $CO_2$/methanol effluent aspect is not addressed. In another approach, neat (100%) methanol is carried as the fuel supply, but fairly involved subsystems are then required to address the fuel mixing, water recovery, and carbon dioxide release issues. This approach is then similar to that used in larger systems, but is directed to miniaturizing the subsystems and their electronic controls to provide a sufficiently compact package.

These approaches are not ideal for small battery-replacement applications, either because of excessive cost and complexity or low fuel energy density. Another important issue that may arise in such applications is positional tolerance, i.e., the ability of the fuel cell to operate irrespective of cell orientation.

The present invention is directed to a direct methanol fuel cell system that manages the water balance and the carbon dioxide release without the need for separate subsystems, that allows the use of neat methanol fuel, and that provides positional tolerance with respect to supplying the fuel.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention includes, in its broadest aspect, a fuel cell having an anode and a cathode and a polymer electrolyte membrane located between anode and cathode gas diffusion backings. A methanol vapor fuel supply is provided. A permeable polymer electrolyte membrane having a permeability effective to sustain a carbon dioxide flux equivalent to at least 10 mA/cm² provides for removal of carbon dioxide produced at the anode by reaction of methanol with water.

Another aspect of the present invention includes a fuel cell having an anode and a cathode and a polymer electrolyte membrane located between anode and cathode gas diffusion backings and using methanol as a fuel. A superabsorpent polymer material is placed in proximity to the anode gas diffusion backing to hold liquid methanol or liquid methanol solution without wetting the anode gas diffusion backing so that methanol vapor from the liquid methanol or liquid methanol-water solution is supplied to the membrane.

Yet another aspect of the present invention includes a fuel cell system with at least one fuel cell having an anode and a cathode and a polymer electrolyte membrane sandwiched between anode and cathode gas diffusion backings and using methanol as the fuel, each fuel cell defining an anode plenum. A superabsorbent material is contained within the anode plenum for modulating methanol access to the anode and holding a liquid methanol-water solution in proximity to the anode gas diffusion backing. A fuel reservoir contains liquid methanol or methanol-water solution as a liquid fuel and a feed line connects the fuel reservoir to the anode plenum of each fuel cell.

BRIEF DESCRIPTION OF THE DRAWINGS

The accompanying drawings, which are incorporated in and form a part of the specification, illustrate embodiment of the present invention and, together with the description, serve to explain the principles of the invention. In the drawings.

DETAILED DESCRIPTION

One aspect of the present invention is directed to the permeability of the polymer electrolyte membrane. To some extent, the pore size and structure of the polymer electrolyte can be modified to influence the bulk transport properties, but ultimately, the permeability depends upon the membrane thickness. In hydrogen fuel cells, it is well known that thin membranes greatly facilitate the back-transport of water from the cathode to the anode compared to thicker versions. Thus, sufficient water supply to the anode to support the methanol reaction at the anode might be achieved with a thin membrane in the absence of a separate water supply to the anode.

Suprisingly, the carbon dioxide produced from the anode reaction can also be removed through the membrane to the cathode by maintaining a suitable A membrane permeability for $CO_2$. While no specific permeation data are available, using the literature solubilities of $CO_2$ in Nafion® materials and a rough estimate of the diffusion coefficient we have found that, while low, $CO_2$ fluxes are at least in the same order of magnitude range needed to sustain reasonable current densities. In accordance with the present invention, carbon dioxide produced at the anode by reaction of methanol with water can be removed through a membrane having a permeability effective to sustain a carbon dioxide flux equivalent to at least 10 maA/cm².

Figure 1:
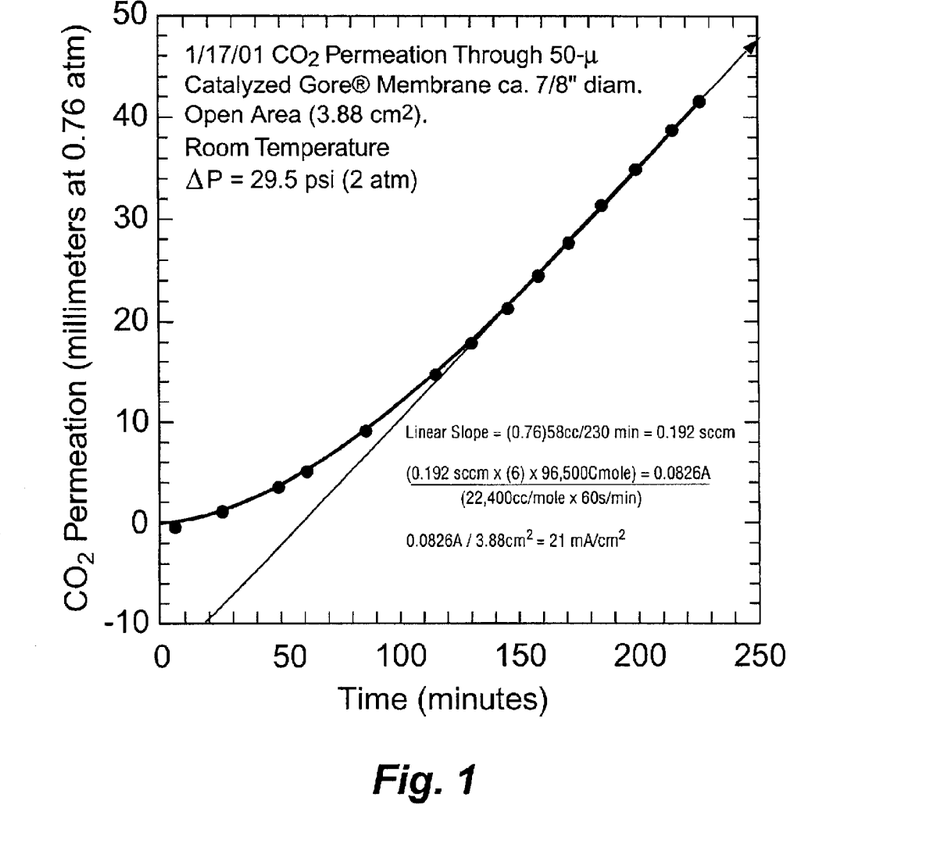
FIG. 1 graphically depicts $CO_2$ permeation through a membrane with a differential pressure of 2 atm.

As a proof of principle, permeation cell measurements, shown in FIG. 1, were done with a catalyzed membrane (Gore-Primea® from W.L. Gore & Assoc.) with an overall thickness of about 50 µm, with the membrane itself about 30 µm thick, which is about the thinnest commercial membrane available. The membrane assembly was dampened with water and some liquid water was allowed to pool in the pressure-side plenum to keep the membrane vapor-hydrated with water. As calculated from the linear portion of the permeation curve depicted in FIG. 1, the room temperature experiment indicated that, with a pressure differential of approximately 30 psi (2 atm), a $CO_2$ flux equivalent to a proton current density of about 21 mA/cm² could be achieved. This suggests that all of the $CO_2$ anode product of the test direct methanol fuel cell could be removed via the membrane if the current density does not exceed 21 mA/cm². Anode pressurization enhances the $CO_2$ flux through the membrane While such a current density is low for "active" direct methanol fuel cell systems, it is not so very different than the current densities achieved with dilute feed "air-breathers." In an operating fuel cell, the temperature will be somewhat higher, which helps carbon dioxide diffusion, but also decreases solubility. A more significant effect may arise from electro-osmotic drag due to proton migration introducing a "convective" contribution that greatly increases the flux.

The use of a permeable membrane in accordance with the present invention a to remove the carbon dioxide from the anode plenum also results in a simple means to remove the methanol vapor that would otherwise be released with the $CO_2$ effluent. In a sense, the anode product carbon dioxide is cleansed of methanol twice before its release: first by electrochemical oxidation of methanol at the anode and secondly by combustion of methanol with oxygen at the cathode. Utilizing the fuel cell electrodes for the cleansing steps and the membrane for pressure release eliminates the need for separate and auxiliary elements such as pressure relief or control devices or condensers (to condense and recover the vapor) or oxidation catalyst beds (to burn the remaining methanol vapor). Consequently, one element of this invention is to release the effluent $CO_2$ to the cathode and use the cathode catalyst and air to oxidize cross-over methanol.

Another aspect of this invention to enable the use of a highly permeable membrane is to supply the methanol reactant in the vapor form. As is well known, a methanol vapor supply limits methanol cross-over, and consequently enables the use of highly permeable membranes in accordance with the present invention. Synergistically, the high back-transport of water allowed by the permeable membrane eventually results in hydration of the membrane and a water-methanol mixture at the anode without the need for an external water supply. An absorbent material placed in an anode plenum can be used to "mix" neat liquid methanol supplied from a fuel tank with anode water condensate, keeping the liquid solution from direct liquid contact with the MEA and backings. The equilibrated methanol vapor pressure over the "mix" supplies a relatively constant and stable methanol vapor supply to the anode, as well as water vapor at or near saturation conditions. A high water content is desirable to maintain high anode performance. Thus, vapor feed is accomplished in a relatively simple manner, as opposed to the recirculated gases and humidifier bottles used in the original vapor cells.

The preferred absorbent is a superabsorbent material. As used herein, a superabsorbent material is a cross-linked polyelectrolyte. Such superabsorbent polymers are well known (e.g., diaper materials) and can absorb up to 500 times their weight of water or water solutions. A rather thorough treatment on the subject is provided by "Superabsorbent Polymers," F. L. Bucholz and N. A. Peppas, Eds., The American Chemical Society, 1994. Superabsorbent materials have a high swelling pressure that permits them to "steal" water and water solutions from adjacent structures. For fuel cells, this means that the superabsorbent material can be placed adjacent a second surface or structure that would otherwise adsorb the solution (such as a porous gas diffusion backing adjacent a fuel cell membrane), and the second surface will not tend to flood out, an important consideration for fuel cell operation to prevent liquid access to the fuel cell membrane.

Water is required for the superabsorbent material since most superabsorbent materials tend to lose their ability to absorb appreciably once they exceed about 50 wt % methanol. However, water is available during operation as vapor supplied via the membrane from the cathode reaction processes. The membrane is designed to provide a high back-diffusion of water to the anode side. So, in contrast to the dilute liquid feed approach where relatively thick membranes (e.g., 7-mil/175 $\mu$m) are used in an attempt to limit methanol permeability, a relatively thin membrane (e.g., 1-mil/25 $\mu$m) provides sufficient water activity at the anode. In the absence of an anode-side source of water, a high water content at the anode is important for effective methanol oxidation kinetics.

The use of more permeable membranes, however, will result in an increased fuel loss from methanol cross-over through the membrane to the cathode. The cross-over methanol is also a source of water for the anode as a reaction product at the cathode that is more volumetrically efficient than carrying actual water. At a certain scale, system simplicity is more important than system efficiency. It will be appreciated that this approach will benefit from membranes that do not preferentially absorb methanol over water, as do Nafion® and other perfluorosulfonates such as the W.L. Gore membranes. Consequentially, nonfluorinated membranes may perform better in this application provided they also offer the requisite stability, conductivity and activity.

An operating consideration is the amount of air access to the cathode to allow maximum power while still maintaining stable performance. Too much air access would initially provide a high power output, but the membrane would quickly dry out and the cell would cease producing useful output power. On the other hand, if not enough air access is allowed, performance suffers due to oxygen reduction reaction (ORR) deficiencies, and cross-over methanol begins to wet out the cathode structure, further limiting performance. Also, an excess accumulation of water in the anode also may overly dilute the methanol concentrations in the superabsorbent material. Accordingly, air access is an optimization parameter to be determined for particular methanol vapor feed fuel cell systems.

In a simplest embodiment, the superabsorbent material provides a barrier/interface between a liquid methanol source and the anode to prevent the liquid methanol from thoroughly wetting out the plenum. An experimental vapor-fed test cell was designed that provides a methanol reservoir of a superabsorbent material and that provides a simple means to alter the air access. The test cell had a field of penetrations in the cathode "endplate" that overlies the porous carbon paper flow-field. The penetrations can be covered to vary the air access from an edge feed to a 50% open face plate.

Figure 2A:
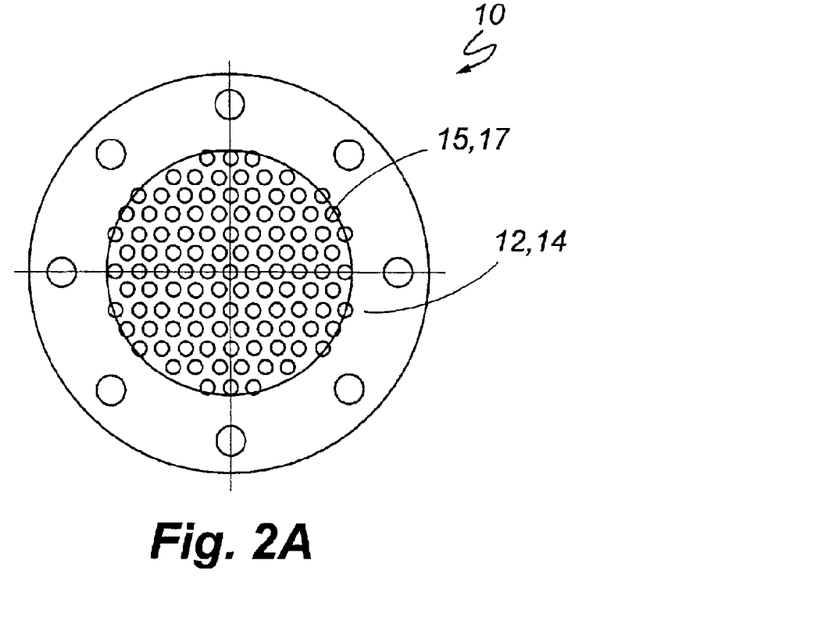
FIGS. 2A and 2B depict a plan view and cross-sectional view of an experimental fuel cell according to one embodiment of the present invention.
Figure 2B:
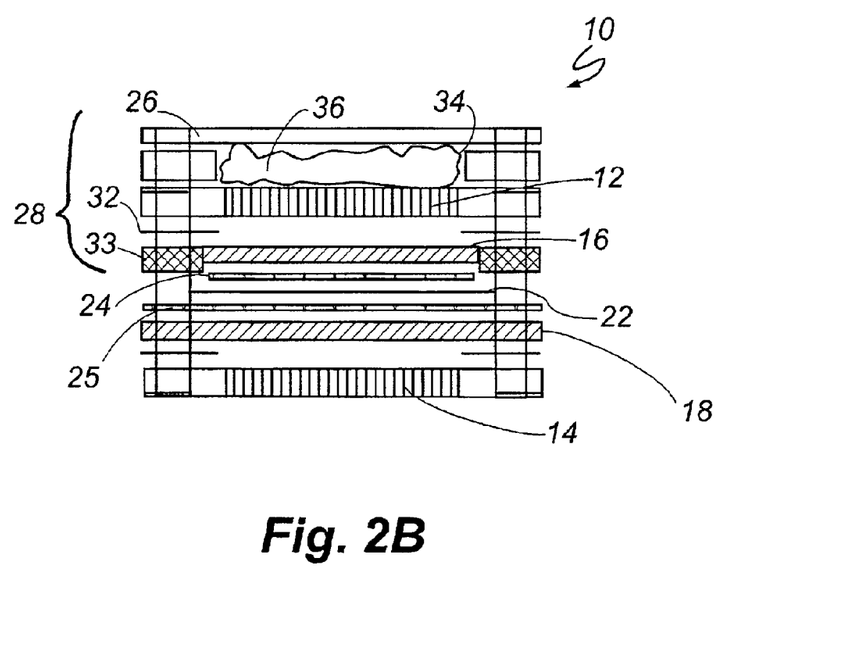

The design of the experimental fuel cell device 10 is shown in FIGS. 2A and 2B. Two center perforated circular "drain" plates 12,14, as shown in the top view of FIG. 2A, are sandwiched back-to-back around carbon paper "flow-fields" 16,18 on either side of the polymer electrolyte membrane (MEA) 22 and backings 24 and 25. Active area of the cell is about 5 cm$^2$. As shown in FIG. 2B, the anode side 28 is sealed from the periphery with gaskets 32, 33 and also has a reservoir cavity 34 on the back end with a polycarbonate (PC) cover 26. The cavity 34 contains the superabsorbent material 36 and barbed fittings (not shown) for connecting external pressure gauges, fuel supplies, and the like. Perforated plate 12 serves as a structural element to provide clamping force across the cell components as well as vapor passages between cavity 34 and the porous carbon paper 16 and gas diffusion backing 24. A polycarbonate cover 26 was used to allow visual inspection of superabsorbent cavity 34 and the degree of swelling. Tie-bolts (not shown) clamp the structure together. It will be appreciated that this cell was a demonstration cell and is not an optimal or commercially viable embodiment.

In the first experiments, methanol was supplied by injecting either neat methanol or a methanol-water mixture straight into superabsorbent reservoir 36. The superabsorbent material 36 was supplied as a powder contained within a polyester fabric "pillow" placed in the cell reservoir, where the pillow material was permeable to the methanol-water solution.

Figure 3:
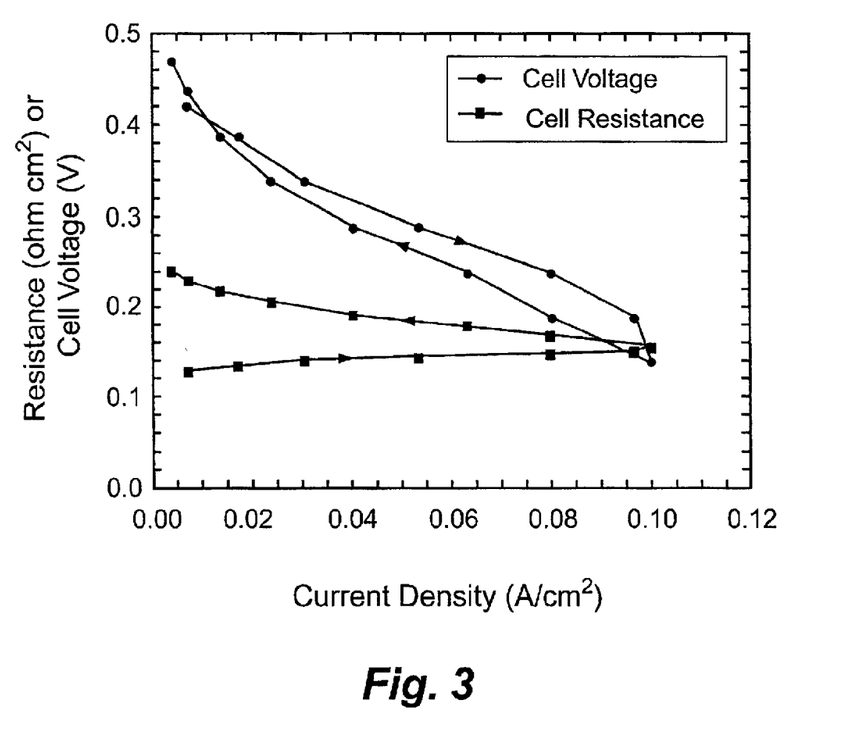
FIG. 3 is a polarization curve for the fuel cell shown in FIGS. 2A and 2B after the injection of 0.5 cc of neat methanol directly into the superabsorbent cavity.

A polarization curve (FIG. 3) and life test (FIG. 4) are shown for operation after injection of a shot of methanol solution straight into the superabsorbent cavity. The polarization curve shows the drying of the membrane that occurs as water is displaced by methanol in the membrane, with a consequent reduction in performance as the current is reduced. Performances as high as 40 mA/cm$^2$ at 0.4 V have been attained on the increasing current curve with some cells, but the current on the return suffers proportionally more.

Figure 4:
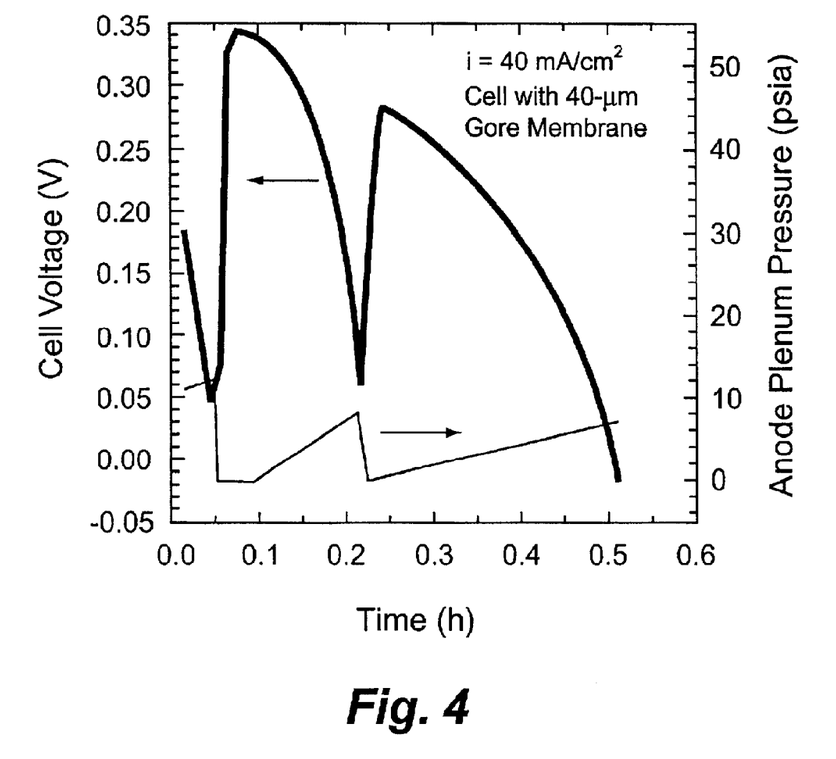
FIG. 4 graphically depicts the performance of a fuel cell as shown in FIGS. 2A and 2B operating at 40 ma/cm² after the injection of 0.6 cc of 10 M methanol solution directly into the superabsorbent cavity.

A life test at a constant current density of 40 mA/cm$^2$ after injection of 0.6 cc of 10 M methanol (and a polarization curve) is shown in FIG. 4. Temporarily, a voltage as high as 0.34 V was attained (13.6 mW/cm$^2$), which was relatively brief primarily because of pressure effects (pressure is plotted below the voltage curve). As $CO_2$ pressure builds up, performance drops, possibly per Fick's law when the methanol mole fraction decreases as total pressure increases. A secondary cause kA of performance decrease is consumption and/or dilution of methanol (only 0.6 cc of 10 M methanol). Consequently, when the pressure is manually vented (as at 0.5 and 2.1 h), cell voltage increases as methanol access is improved.

Figure 5:
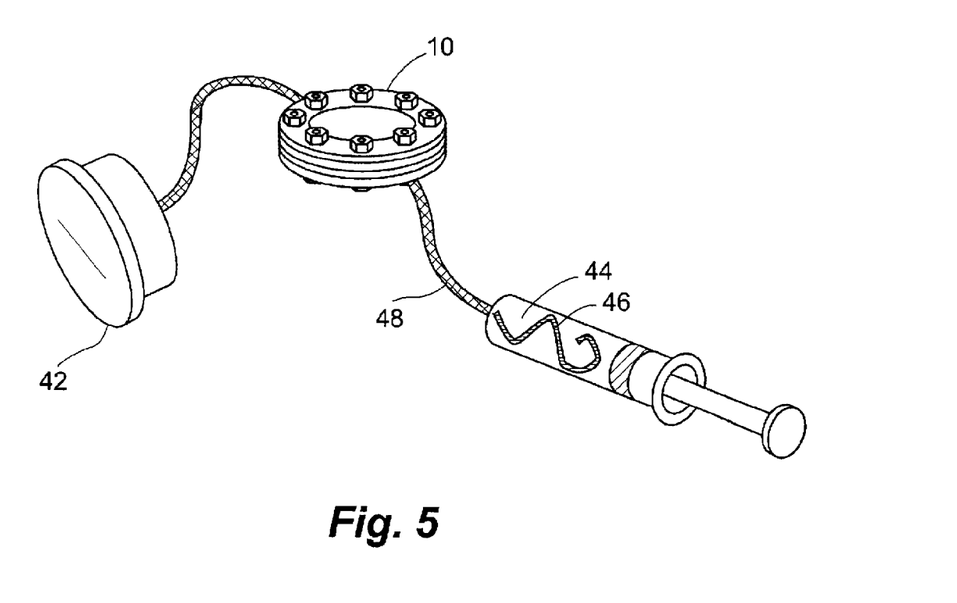
FIG. 5 pictorially depicts an experimental configuration using a fuel cell as shown in FIGS. 2A and 2B using a syringe fuel tank and a wicked fuel line.

Eventually, the arrangement depicted in FIG. 5 was implemented. A pressure gage 42 was attached to one of the superabsorbent reservoir fittings of drain cell 10, but the other fitting was connected to a syringe 44. A cotton wick 46

(about 0.8 mm in diameter) was threaded through tubing 48 leading from the body of a 3 cc syringe 44 into the drain cell cavity 34 (FIG. 20) where it was coiled once adjacent to superabsorbent pillow 36. Clearance between the swollen thread 46 and the tube walls 48 allowed the gas pressures to equilibrate between the two vessels. This arrangement demonstrated the concept of a neat methanol fuel tank.

Figure 6:
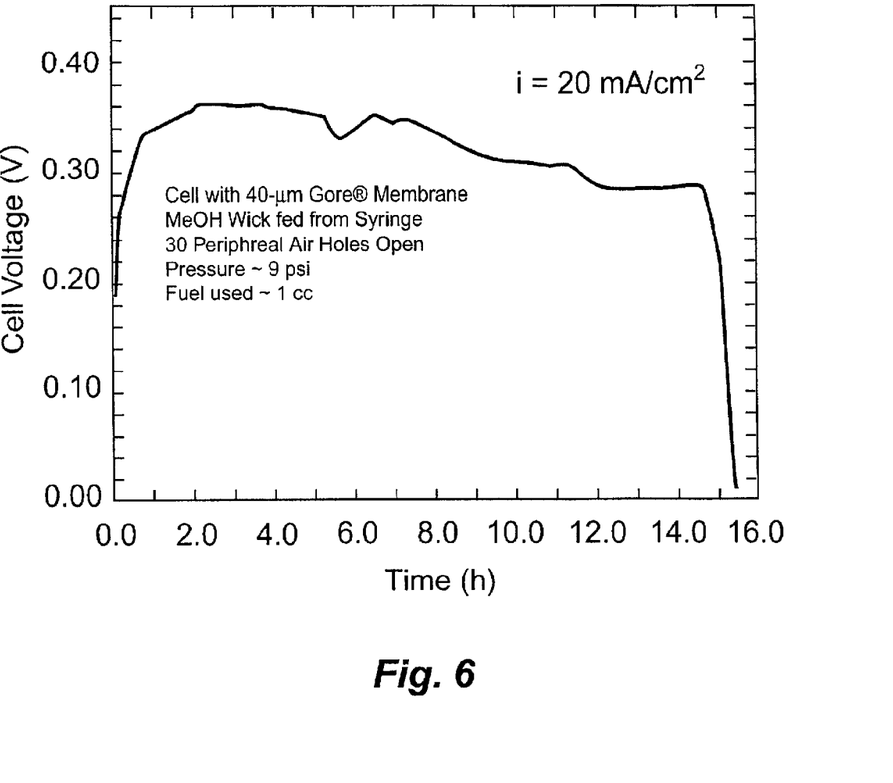
FIG. 6 graphically depicts extended performance results from an experimental configuration as shown in FIG. 5.

Cell 10, shown in FIGS. 2B and 4, was operated at 20 mA/cm$^2$ with 30 of about 98 air perforations 17 open, all around the periphery of the perforation field of cathode drain plate 14. As shown in FIG. 6, the cell ran for about 15 hr while consuming about 1 cc of fuel. Some liquid remained in syringe 44, which suggests that the system was possibly running too wet and/or water was wicked back to the syringe. On a 1 cc basis, the current efficiency was calculated to be 40%. While this is low compared to a carefully controlled "active" system using, e.g., fuel blending, it is not unreasonable for a simple air-breather system operating on a neat methanol supply. Even though at this point the power density was not particularly high (~6 mW/cm$^2$), the completely passive system (no operator or system controls intervention) operated with promising stability and duration.

Subsequently, the cell and system were carefully checked for leaks and life tests with higher current densities were obtained to explore the carbon dioxide removal and anode pressure issues. Also, system start-up from dry conditions and the influence of air access on desirable operating conditions were investigated for practical applications. The start-up tests were performed after the cell was inactive for several days to allow the superabsorbent to dry out. Syringe 44 was then filled with several cc's of neat methanol, which wicked into the drain cell 10 and wetted the polyester fabric of superabsorbent pillow 36. The dry cell slowly started to produce water (both from methanol electro-oxidation at the anode and chemical oxidation at the cathode), and performance slowly improved as the level of hydration and temperature increased.

In one example, the 30 mA/cm$^2$ target current density was achieved about 10 minutes after introduction of the fuel. The superabsorbent pillow 36 slowly swelled with a methanol water mixture. Several more air holes distributed across the center region of perforation field 17 were opened to allow the cell to run slightly drier. Overall, the cell took somewhat over an hour to reach maximal performance and ran at a relatively stable voltage for about five hours at pressures reaching 32 psi. Previous runs had shown evidence of insufficient methanol access at high pressures so a double wick was used in this example. In such examples, the ability to operate under rather high anode pressures while maintaining relatively stable performances was demonstrated. Start-up would be hastened and performance improved in dry or high temperature conditions if even a small amount of water were supplied with the methanol fuel. Instead of neat methanol, a fuel could be used that is slightly diluted to, say, 10% with water. The proportionate loss in fuel energy density may be favorably off-set by the increase in the fuel cell operational envelope.

The above results utilized cell components that were based on unoptimized technologies; e.g., the anode catalysts were not particularly active, and the membranes used were not the thinnest available. Subsequently, updated cells were fabricated using a more active anode catalyst, Hi-Spec 6000, commercially available from Johnson-Matthey. Likewise, even thinner membranes from W. L. Gore were used, of about 30 um thick.

Figure 7:
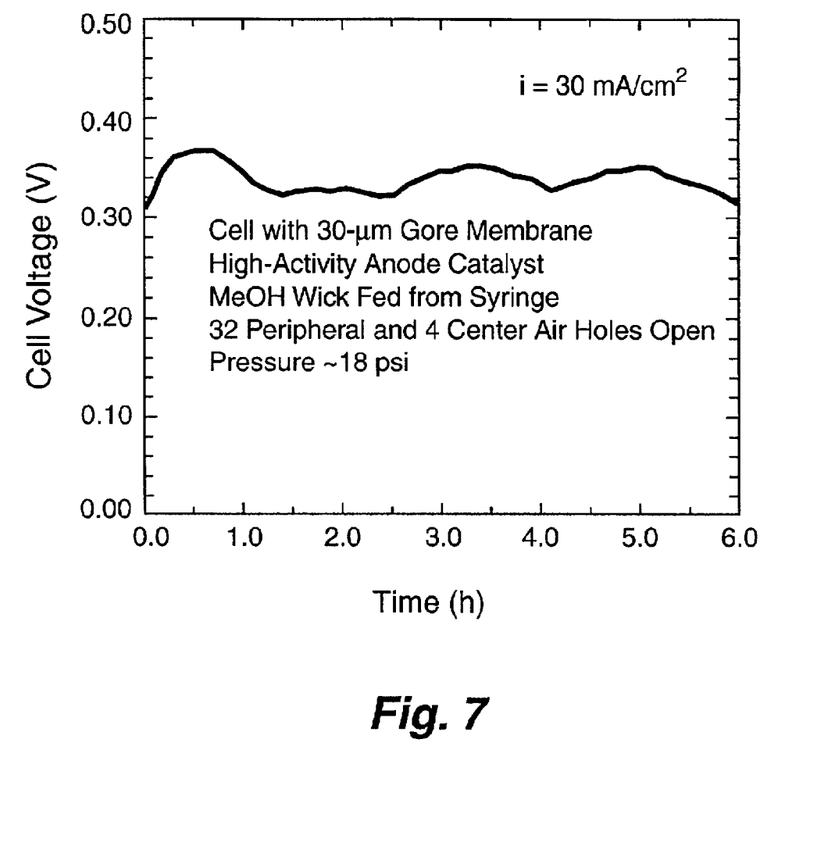
FIG. 7 graphically depicts performance results from a fuel cell using improved components in an experimental configuration as shown in FIG. 5.

FIG. 7 depicts the cell voltage for a drain cell system with a wicked syringe feed, as described in FIG. 5, and with the enhanced anode catalyst and thinner membrane. The power density remained around 10 mW/cm$^2$, considerably higher than the performance shown in FIG. 6, for the six hours of the test shown in the FIG. 7.

The results depicted above have all been for cells operating at constant currents. In many practical applications, the device is more likely to be used in a constant voltage mode. While a useful diagnostic tool and a good means of establishing equilibrium anode-side (carbon dioxide) pressures, constant current operation is not likely to be used on many occasions. If, for example, the fuel cell is used as a battery charger, a number of cells in series would be used to charge the battery. Since the charge and discharge voltages of most batteries are not very different, the fuel cell would operate in a quasi-constant voltage mode. The fuel cell would then deliver whatever current it was capable of at that particular cell voltage.

Figure 8:
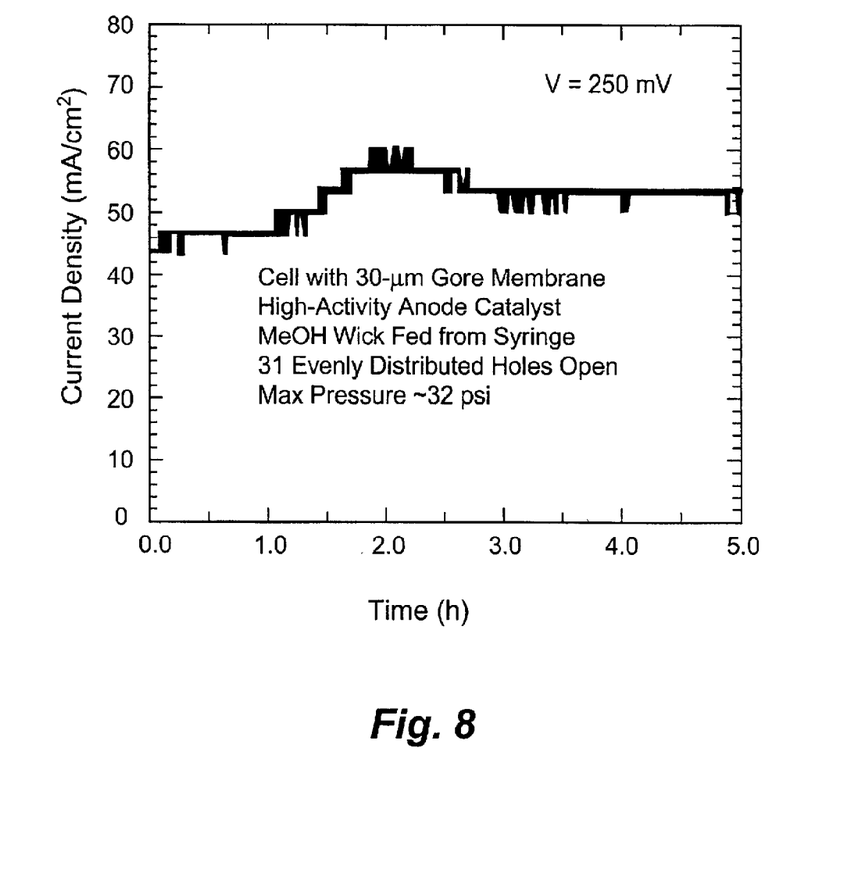
FIG. 8 graphically depicts the current density over time at a constant 0.25 V for an improved fuel cell in the configuration shown in FIG. 5.

In order to observe the fuel cell behavior under such operating conditions, an updated cell was switched to run at a constant cell voltage of 250 mV after first running some time at a low constant current density. FIG. 8 depicts the cell current density over the first five hours of the test. Since current densities approaching 60 mA/cm$^2$ were achieved, the cell pressure increased to 32 psi despite the thinner (and correspondingly higher permeability) membrane. In this case, the cell attained an even higher power density than before, approaching 15 mW/cm$^2$.

The majority of the results described above were performed using membranes available from W.L. Gore. Nafion® 112 membranes of 50 μm thickness were not sufficiently permeable to keep the pressure build-up at a reasonable level. The membranes from Gore are a composite of expanded Teflon® and Nafion®, so the active material is not necessarily a majority of the structure. To determine whether the composite material has specific advantages over equally thin Nafion® membranes, as far as the carbon dioxide permeability is concerned, a Nafion® 112 membrane was "thinned" by swelling the material while in the sodium form in glycerol at 230° C., then rinsing, protonating, and drying the membrane on a vacuum table. The resulting membrane was only 25 μm thick (dry), but was still robust and durable.

A cell was assembled using the thin Nafion® membrane. The cell performance was not substantially different from cell performances with the thinner Gore membrane, so there did not appear to be any overt consequences of the change in membrane. When operated at 40 mA/cm$^2$, the anode pressure eventually built up to 24 psig, not so different than that anticipated with the Gore membrane cells. While a number of factors, e.g., exact current density, cell temperature, membrane hydration level, and the like, influence pressure buildup and permeation rate to make an exact comparison difficult, it appears that the 25 μm thick Nafion® membrane is at least as permeable as the 30 μm membrane from Gore.

In the simplest embodiment, the superabsorbent material modulates the access of neat methanol from a fuel tank to the anode plenum to prevent it from flooding the structure. For example, if the fuel tank is positioned overhead, the methanol supply will be at a somewhat higher head pressure and would readily pass through a conventional non-selective absorbent and flood the anode plenum. The superabsorbent prevents this because of two properties. First, it does not swell in neat methanol, so the pores close down where it is in direct contact with the neat methanol and the flux is substantially decreased. Secondly, when water is present, the, superabsorbent holds onto water solutions very tenaciously, such that liquid does not flow on into the anode plenum. Swelling pressures of up to 3 psig have been observed with superabsorbents. Accordingly, if the fuel supply from the neat methanol tank is passed through an appropriate superabsorbent structure, the fuel supply can be at a positive pressure with regard to the anode plenum and not flood out the plenum. Consequently, a positionally tolerant system fuel supply system can be achieved. Also, it can be appreciated that the superabsorbent fuel modulation approach is useful when the cell is started up from a dry state, as the superabsorbent prevents methanol at a higher pressure from initially flooding the cell when the fuel tank is filled. An appropriate leak-tight superabsorbent structure has been attained, for example, by polymerizing a cross-linked polyelectrolyte disk around the mouth of the feed line.

A difficulty with such a superabsorbent-modulated fuel system arises when the anode plenum becomes pressurized by the $CO_2$ product (the $CO_2$ pressurization is actually desired to affect the removal of the $CO_2$ through the membrane as discussed above). In any case, with a pressure buildup in the anode plenum, a substantial pressure gradient would then be generated over time between the anode plenum and the fuel tank if the superabsorbent material is positioned to modulate fuel access. Eventually, the pressure build-up would either force the solution in the superabsorbent back into the fuel tank or $CO_2$ would collect in the fuel tank. In the latter case, the high pressure $CO_2$ could force the fuel into the plenum through the superabsorbent material once the cell is turned off and the anode pressure drops.

Figure 9:
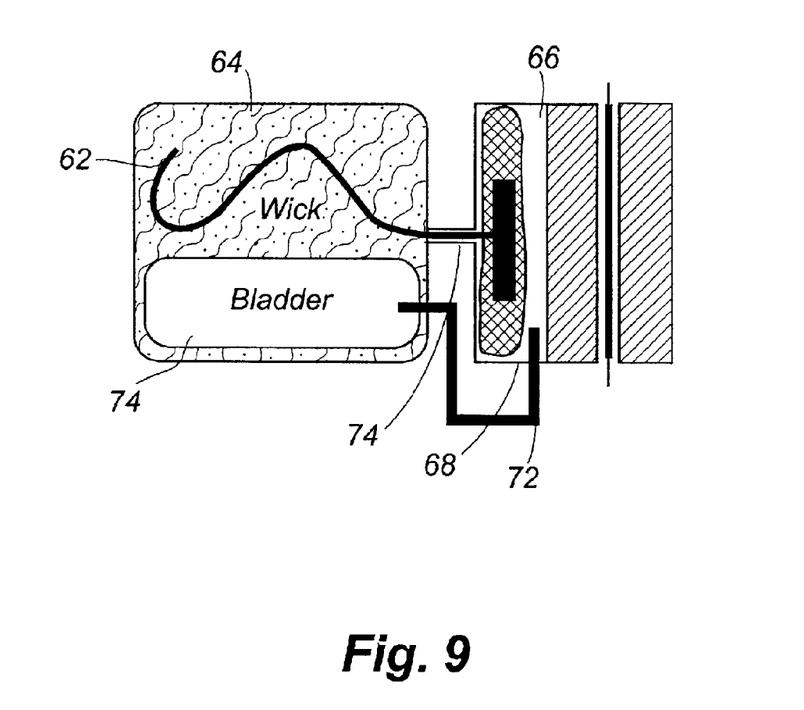
FIG. 9 schematically depicts one embodiment of a fuel cell system for managing a methanol vapor fed fuel supply that is both position and pressure swing tolerant.

As shown in FIG. 9, one approach around these difficulties is to balance the pressure across fuel line 62 between the fuel tank 64 and the vapor area 66 of the anode plenum 68 through pressure equalization line 72. Then, to allow positional tolerance, the fuel tank 64 side of "vent" line can either float, so it stays in the headspace, or it can be connected 72 to flexible headspace bladder 74. In the latter case, the fuel-side is then never in contact with vent gas. The system shown in FIG. 9 results in a simple direct methanol system that is position tolerant, allows the use and storage of neat methanol, and limits the methanol access to the anode. It also allows pressurization of anode plenum 68 arising from the generation of $CO_2$. The ability to pressurize anode plenum 68 and the need for more permeable membranes to maintain the water balance allows the product $CO_2$ to escape through the membrane.

If the bladder 74 is preformed such that bladder 74 tends to fill the fuel tank 64 when unpressurized, then the fuel in tank 64 will always be at a slightly higher pressure than the contents of the headspace bladder 74 and the vapor area 66 of the anode plenum 68. This allows the use of a small-bore capillary line 62 to transfer fuel instead of a wick-containing line 62. The advantage of capillary feed tube 74 is that back-diffusion of water into fuel tank 64 would tend to be less against the flow in a fine capillary orifice than against the flow through a convoluted wick. Positional tolerance would still be achieved due to the slightly higher pressure fuel supply. Fuel tank 64 can be readily refilled under pressure to contract the volume of headspace bladder 74. It can be appreciated that the fuel storage aspect of the invention is not limited solely to the configuration depicted, as any number of means are available to separate the headspace and fuel in a vessel while imposing a pressure differential between the two.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fuel cell having an anode and a cathode and a polymer electrolyte membrane located between anode and cathode gas diffusion backings, the improvement comprising:
    a methanol vapor fuel supply; and
    the polymer electrolyte membrane having a permeability effective to sustain a carbon dioxide flux equivalent to at least 10 $mA/cm^2$ for removal of carbon dioxide produced at the anode by reaction of methanol with water;
    wherein the methanol vapor fuel supply comprises a cross-linked polyelectrolyte polymer material in proximity to the anode gas diffusion hacking to hold liquid methanol or liquid methanol solution without wetting the anode gas diffusion backing so that methanol vapor from the liquid methanol or liquid methanol-water solution is supplied to the membrane.

2. The fuel cell according to claim 1, further including a cathode inlet effective to limit access of oxidant for the cathode to optimize a balance between the oxygen reduction reaction at the cathode and drying of the membrane.

3. The fuel cell according to claim 1, wherein the crop linked polyelectrolyte polymer material is a crosslinked polyelectrolyte powder placed within a bag that is permeable to the liquid methanol or liquid methanol-water solution.

4. A fuel cell having an anode and a cathode and a polymer electrolyte membrane located between anode and cathode gas diffusion backings and using methanol as a fuel, the improvement comprising:
    a crosslinked polyelectrolyte polymer material in proximity to the anode gas diffusion backing to hold liquid methanol or liquid methanol solution without wetting the anode gas diffusion backing so that methanol vapor from the liquid methanol or liquid methanol-water solution is supplied to the membrane.

5. The fuel cell according to claim 4, further including a cathode inlet effective to limit access of oxidant for the fuel to balance the oxygen production reaction at the cathode for performance with drying of the membrane.

6. The fuel cell according to claim 4, wherein the cross-linked polyelectrolyte polymer material is a cross-linked polyelectrolyte polymer powder placed within a bag that is permeable to a liquid methanol or liquid methanol-water solution.

7. A fuel cell system comprising:
    at least one fuel cell having an anode and a cathode and a polymer electrolyte membrane sandwiched between anode and cathode gas diffusion backings and using methanol as the fuel, each fuel cell defining an anode plenum,
    a cross-linked polyelectrolyte polymer material contained within the anode plenum for modulating methanol access to the anode and holding a liquid methanol-water solution in proximity to the anode gas diffusion backing without wetting the anode gas diffusion backing so that methanol vapor from the liquid methanol or liquid methanol-water solution is supplied to the membrane;

a fuel reservoir for containing liquid methanol or methanol-water solution as a liquid fuel; and a feed line connecting the fuel reservoir to the anode plenum of each fuel cell.

8. The fuel cell system of claim 7, further including a wick connecting the fuel reservoir to each anode plenum through the feed line to provide liquid fuel to the cross-linked polyelectrolyte polymer material.

9. The fuel cell system of claim 7, further including an expandable separator in the fuel reservoir separating the liquid fuel from a headspace volume and a pressure equalization line connecting the anode plenum to the headspace for directing $CO_2$ reaction product from the anode to the headspace side to balance pressure between the anode plenum and the fuel reservoir.

10. The fuel cell system of claim 9, further including a wick connecting the fuel reservoir to each anode plenum through the liquid feed line to provide liquid fuel to the cross-linked polyelectrolyte polymer material.

11. The fuel cell system of claim 9, further including a capillary feed line connecting the fuel reservoir to each anode plenum to provide liquid fuel to the cross-linked polyelectrolyte polymer material.

12. The fuel cell system of claim 9, wherein the fuel reservoir separator is expandable to maintain the liquid fuel side at a higher pressure than the headspace volume.

* * * * *